Aug. 21, 1956  A. W. SHARP  2,759,216
FOWL PICKING MACHINE
Filed May 31, 1952  3 Sheets-Sheet 1
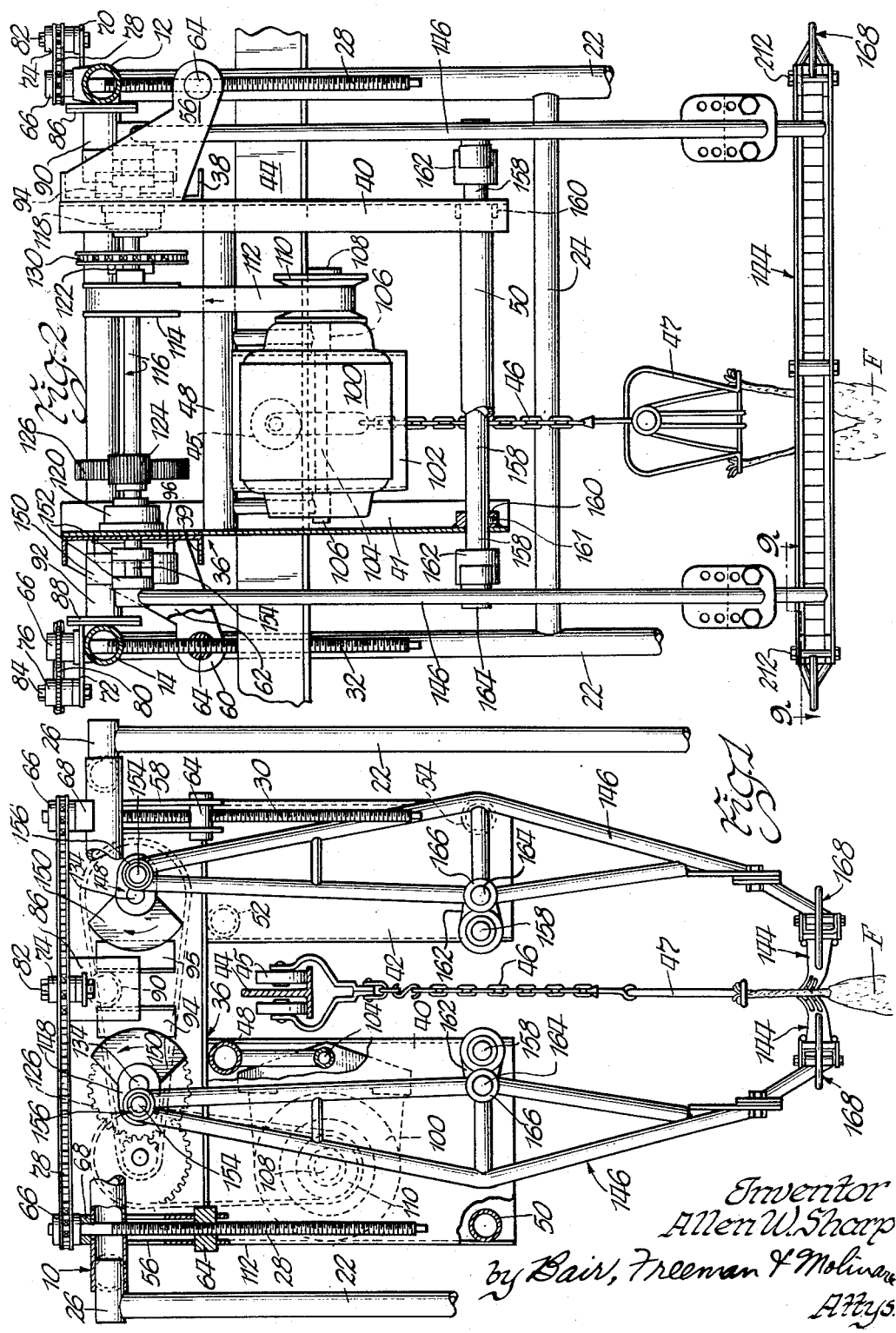
Inventor
Allen W. Sharp
by Bair, Freeman & Molinare
Attys.

Aug. 21, 1956     A. W. SHARP     2,759,216
FOWL PICKING MACHINE
Filed May 31, 1952     3 Sheets-Sheet 2
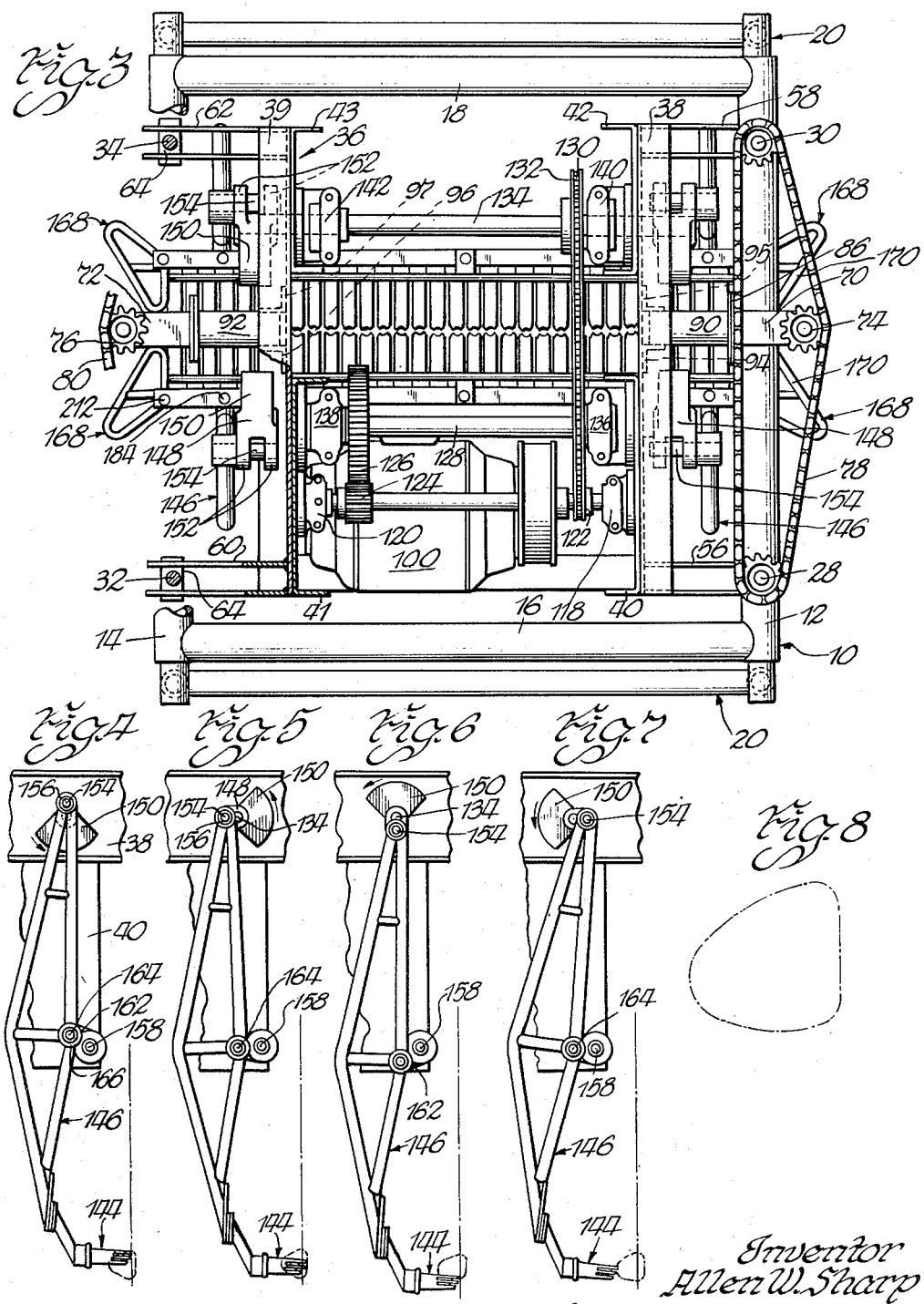
Inventor
Allen W. Sharp
by Bair, Freeman & Molinare
Attys.

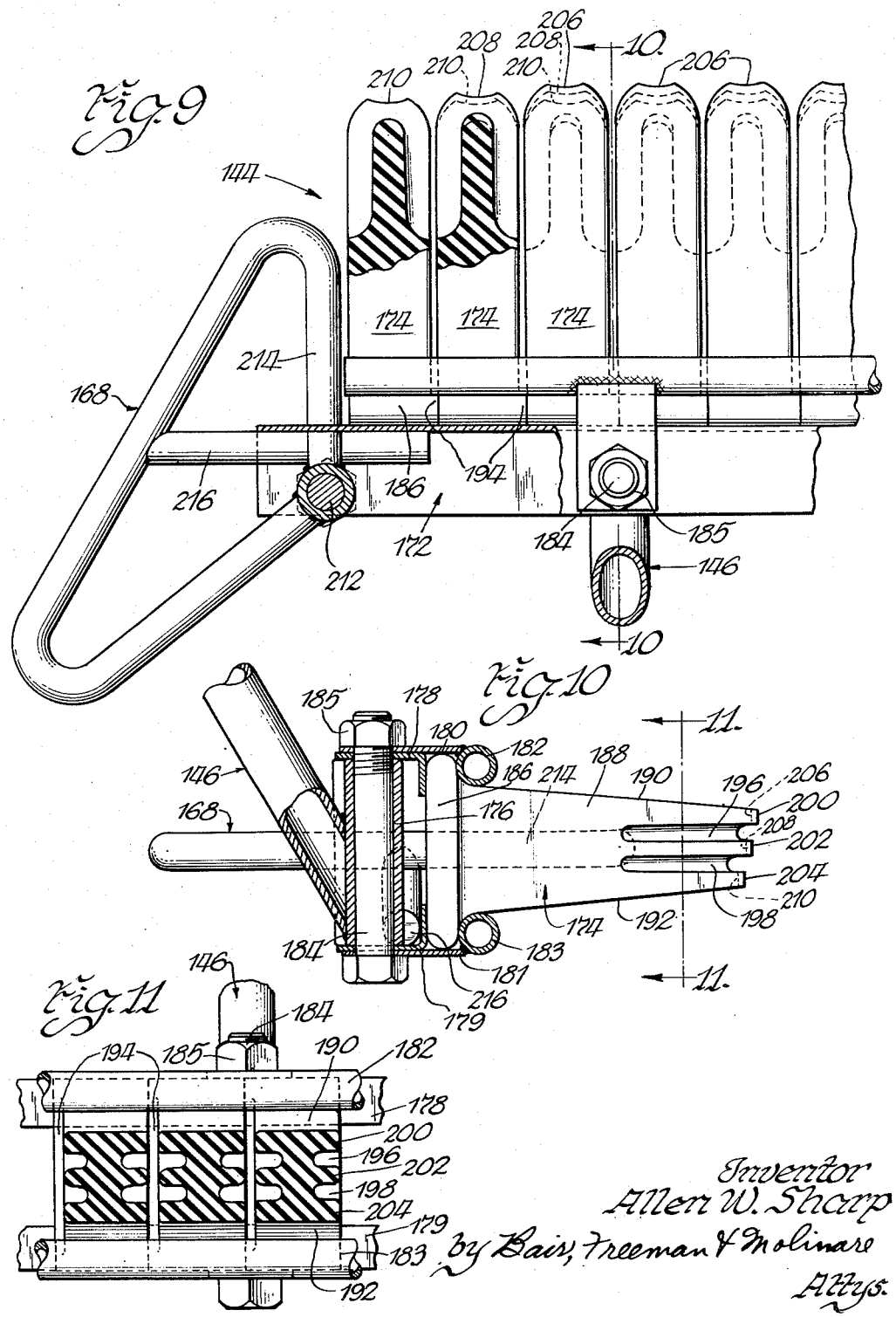

United States Patent Office 2,759,216
Patented Aug. 21, 1956

2,759,216

FOWL PICKING MACHINE

Allen W. Sharp, Ottumwa, Iowa, assignor to Barker Poultry Equipment Company, Ottumwa, Iowa, a corporation of Iowa Application May 31, 1952, Serial No. 291,035

4 Claims. (Cl. 17—11.1)

This invention relates to a picking machine for fowl or the like, and more particularly, to a machine for picking the garter feathers of fowl.

Machines for picking feathers from fowl have been primarily of the rotary drum type, wherein a rotating member or drum having a large plurality of picking fingers mounted thereon, is applied to the body of the fowl. While such machines have been fairly successful in picking feathers from the body of a fowl, they have thus far been unsuccessful in picking the garter feathers of a fowl.

In preparing fowl for the market, it is, of course, desirable that all feathers be removed from the body of the fowl. The failure by picking machines, heretofore, to remove the garter feathers has required that this operation be performed by hand. Such hand operations are costly; and it would be more desirable and economical to do this operation by machine.

Thus, one object of this invention is to provide a novel machine for picking the garter feathers from fowl.

One of the reasons why picking machines, heretofore, have failed to pick the garter feathers is found in the fact that the picking elements or members move in a circular path. The distance from the center of rotation of the drum upon which the picking members are mounted, to the extended tip of the picking members, is large relative to the actual length of the portion of the fowl being picked. Since the fowl is suspended from a shackle with the feet spread apart and with the legs converging to their points of connection to the body, when the rotating picking drum is moved into position for picking the garter feathers, it is found that there is interference between the rotating picking members and the shackle. This interference may result in the damaging of the picking members or fingers which, of course, is undesirable.

Thus, another object of this invention is to provide a novel machine for picking garter feathers from fowl, wherein there is no interference between the picking members and the fowl suspending shackle.

In order to pick opposite sides of a portion of the fowl, it is necessary to either manipulate the fowl so as to present each of opposite sides of the fowl to the picking machine or, to position a portion of the body between a pair of opposed picking machines. With respect to relatively thick portions of the fowl, such as the trunk, this positioning between opposed picking machines is satisfactory, but with relatively thin portions of the fowl, such as the leg, the positioning of said portion between opposed rotating picking machines is completely unsatisfactory because of the interference of the picking fingers carried by the opposed rotating picking machines.

When a fowl is carried between a pair of picking machines with the shackle positioned in a plane generally transverse to the direction of movement of the conveyor, then the picking drums, when positioned to pick the garter feathers, are only able to pick one side of each leg. This, of course, is undesirable. If the shackle is rotated 90° so that it is in a plane parallel to the direction of movement of the conveyor, and then rotating picking drums are applied to the portions of the body for the purpose of picking the garter feathers, as these rotating picking drums are moved closer to each other, the undesirable possibility of fingers on opposed drums becoming entangled or striking against each other increases. This is particularly undesirable with rotating members wihch have a high R. P. M., as severe damage may result.

Furthermore, the rapid increase in the relative size of the portion of the torso or trunk adjacent the garter feathers poses the problem of burning or damaging the flesh of the fowl when the rotating picking drums are positioned so as to pick the garter feathers.

Thus, a further object of this invention is to provide a machine for picking feathers from selected portions of fowl, wherein the movement of the picking members is restricted to a path which brings the picking members into picking engagement with only the selected portions of the fowl.

Still another object of this invention is to provide a machine for picking garter feathers simultaneously from all sides of the legs of a fowl.

Still a further object of this invention is to provide a machine for picking feathers from portions of the body of a fowl wherein a pair of opposed picking members are adapted to engage each other over the picking portions of the paths of movement of said picking members, without any damage or entanglement resulting to said picking members as a result of such engagement.

And still another object of this invention is to provide a machine for picking garter feathers from fowl, wherein the picking elements substantially surround and engage the leg of the fowl at an initial point, then move substantially longitudinally along the leg in picking engagement therewith, then release the leg and withdraw therefrom, and then return to said initial point whereupon the cycle is repeated.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which Figure 1 is an end elevation of my novel picking machine showing its application to picking garter feathers from fowl carried along a conveyor, and is taken looking from the right side of Figure 2.

Figure 2 is a side elevation of the picking machine shown in Figure 1.

Figure 3 is a fragmentary plan view, looking downward on Figure 2 and with the conveyor omitted.

Figures 4 to 7 show successive diagrammatic views of the novel movement of the picking members of the picking machine shown in Figures 1 to 3, each view showing the parts after the drive member is moved 90° beyond the preceding view.

Figure 8 is an enlarged sketch of the full path of movement of the tip of the picking member.

Figure 9 is an enlarged plan view of one end of one of the picking members showing some of the details of construction.

Figure 10 is a view taken on the line 10—10 of Figure 9, and

Figure 11 is fragmentary cross-section view taken on line 11—11 of Figure 10.

Referring now to the figures, there is shown in Figures 1 to 3 a top frame generally indicated at 10, comprising a front tubular member 12, a rear tubular member 14 and interconnecting side tubular members 16 and 18. The side tubular members 16 and 18 are connected at their ends by welding, or the like, to front and rear tubular members 12 and 14 at points adjacent the ends thereof, so as to leave the ends of tubular members 12 and 14 open and unobstructed.

The top frame 10 is supported by a pair of stands generally indicated at 20, positioned on opposite sides of the conveyor. Each stand 20 has a pair of upwardly extending tubular legs 22 connected intermediate their ends by cross-members 24. Tubular studs 26 are welded to the top ends of the vertical legs 22 and are adapted to be telescoped into the open ends of tubular member 12 and 14.

Extending through the front tubular member 12 and supported thereby are threaded height adjustment shafts 28 and 30. Similar height adjustment shafts 32 and 34 exend through rear tubular member 14 and are supported thereby.

Suspended from the height adjustment shafts 28, 30, 32 and 34, is a picking machine sub-frame, generally indicated at 36. The sub-frame 36 comprises a pair of parallel top channels 38 and 39 having their legs extending in opposite directions, a first pair of opposed downwardly depending channels 40 and 41, and a second pair of opposed downwardly depending channels 32 and 43. The extended legs of the pairs of channels 40, 41 and 42, 43 extend toward each other. The first and second pair of spaced channels are laterally spaced apart to accommodate the movement therebetween of a supporting conveyor for fowl. The webs of the vertically extending channels 40, 41 and 42, 43 are positioned in abutting relation to the webs of the top channels 38 and 39, and are secured thereto by appropriate means, such as by welding.

The conveyor referred to is best seen in Figure 1 and includes an inverted T-shaped track 44, a carriage 45 adapted to run along the track, a chain 46, suspended below the carriage 45 and supporting a shackle 47, adapted to hold the fowl F.

Referring back to the sub-frame 36, tubular spacers 48, 50, 52 and 54, join the opposed pairs of vertically extending channels together so as to form a unitary and rigid structure.

Extending from sub-frame 36 are four support members or assemblies 56, 58, 60 and 62, each having a threaded adjustment block 64 secured thereto. Each of said threaded shafts 28, 30, 32 and 34 is threaded through its associate block 64 to provide the supporting connection between the height adjustment shafts and the support members of the sub-frame 36.

Referring back to the threaded height adjustment shafts 28, 30, 32 and 34, each said shaft is provided at its upper end with a head 66 in rotatable bearing relation with supports 68 which are welded to front and rear tubular members 12 and 14. Brackets 70 and 72, respectively, are welded to front and rear tubular members 12 and 14, and have tensioning-adjustment members 74 and 76 rotatably mounted thereon. The heads 66 on the threaded height adjustment shafts and the tensioning-adjustment members 74 and 76 are provided with gears secured thereto. Chain 78 is trained over the gears associated with shafts 28 and 30 and tensioning-adjustment member 74. Chain 80 is trained over the gears associated with vertical adjustment shafts 32 and 34 and tensioning-adjustment member 76.

The tensioning-adjustment members 74 and 76 are provided respectively with hexagonal heads 82 and 84 to provide means for rotating the tensioning-adjustment heads so as to raise or lower the sub-frame supported on the height adjustment shafts. The tensioning-adjustment members 74 and 76 not only provide means for simultaneously rotating each pair of height adjustment shafts but also tension the cooperating chains 78 and 80 and hence the reference to members 74 and 76 as tensioning-adjustment members.

Means for guiding the vertical movement of the sub-frame 36 with respect to the top frame 10, and also for resisting lateral and longitudinal movement of sub-frame 36 with respect to top frame 10, is also provided. These guide means include cooperating elements on the top frame 10 and on the sub-frame 36. Secured to front and rear tubular members 12 and 14 are brackets 86 and 88, and secured, respectively, to these brackets 86 and 88 are tubular shafts 90 and 92 extending toward each other. The extended ends of the tubular stubs 90 and 92 are each positioned between a pair of spaced angle clips 94, 95 and 96, 97 welded respectively to the webs of the cross-channels 38 and 39 of the sub-frame 36.

The picking means and the drive therefor are mounted on sub-frame 36 and will now be described. The drive means includes a motor 100 mounted on a base plate 102, and pivotally supported on shaft 104. Shaft 104 is journalled in a plurality of hangers 106 suspended from cross-tubular member 48 of the sub-frame 36. The motor has a shaft 108 on which is mounted a drive pulley 110. The drive pulley 110 drives belt 112 which in turn is trained over a pulley 114 mounted on countershaft 116.

The countershaft 116 is journalled on bearings 118 and 120, appropriately secured to channels 40 and 41 of sub-frame 36. The countershaft has drive gears 122 and 124 thereon. The gear 124 is in direct mesh with a gear 126 which is secured to a drive shaft 128. The other gear 122 has a chain 130 trained thereover and serves to drive gear 132 mounted on a drive shaft 134. The drive shafts 128 and 134 are suitably journalled respectively in bearings 136, 138 secured to channels 40, 41, and in bearings 140, 142 secured to channels 42, 43 of sub-frame 36.

The drive shafts 128 and 134 synchronously drive similar picking members positioned on opposite sides along the run of the conveyor. It is only necessary to describe the operation of one picking member and the drive therefor to understand the action of the machine.

The picking member used in this machine is an elongated member 144 positioned on one side of the run of the conveyor and is supported at the ends thereof by a pair of horizontally spaced elongated members, generally indicated at 146. The upper end of each elongated member 146 is rotatably secured to an offset crank or drive link 148, which is drivingly secured to the drive shaft 128 or 134.

Each end of the drive shafts 128 and 134 extends beyond its associate bearings and has a drive link 148 secured thereto. The drive link extends radially in opposite directions and has a counterweight 150 at one end thereof and a pair of ears 152 at the other end. The pair of ears 152 are bored to receive a shaft therein. A stub shaft 154 is secured in the bores in ears 152 and is rotatably journalled in a bearing 156 secured at the end of elongated member 146.

Each elongated member 146 is pivotally secured at a point intermediate its ends to a fulcrum or pivot shaft, generally indicated at 158. The pivot shafts 158 extend through the webs of each pair of opposed vertically extending channels 40, 41, and 42, 43. Shaft 158 extends through stub collars 160 secured to said vertically extending channels of sub-frame 36 and is secured with respect thereto by means of set screws 161 in collars 160. The ends of shaft 158 extend beyond the supporting channels and have guide links 162 pivotally mounted thereon. Each guide link 162 is pivoted at one end on shaft 158 and has a bore through the extended end thereof. A stub shaft 164 is secured in said bore in the extended end of guide link 162 and is also journalled in a bearing 166 on elongated member 146 to allow for the pivoting movement between member 146 and link 162.

The effective length of each of the links 148 and 162 is the length from the center line of the shaft to which the link is secured to the center of the shaft which is secured to the extended end of the link. Thus, the effective length of link 148 is from the center line of drive shaft 134 to the center line of stub shaft 154; and the effective length of link 162 is from the center line of fulcrum shaft 158 to the center of stub shaft 164.

Now, first of all, in order for the machine to operate in the desired manner, the effective length of link 162 must be greater than the effective length of link 148. In the particular machine shown herein, the effective length of link 162 is twice that of link 148.

Secondly, when fulcrum link 162 is substantially horizontal, as shown in Figure 1, the center line of the stub shaft 164 must be substantially vertically below the center line of drive shaft 134.

These latter two features are essential in order that the path illustrated in Figures 4 to 7 is obtained. Referring now to Figures 4 to 7, when link 148 is in the top dead center position shown in Figure 4, the extended tip of the picking member 144 is substantially at the uppermost portion of the path of movement of the picking member. As the link 148 is swung 90° to the position shown in Figure 5, the extended tip of the picking member 144 is moved substantially vertically to the position shown in Figure 5, and at that point the center of stub shaft 164 is substantially vertically below the center line of drive shaft 134. In Figure 6 the extended tip of picking member 144 is substantially at the lowermost portion of the path of travel of the picking member, as shown therein.

Figure 7 shows the intermediate position of the picking member in moving from the positions shown in Figure 6 to that in Figure 4. It will be seen that the picking member in moving from the position shown in Figure 6 to the position shown in Figure 4 is withdrawn laterally, and goes through a fairly arcuate path from the position shown in Figure 6 to the position in Figure 4. In moving from the position shown in Figure 4, through the position shown in Figure 5, and to the position shown in Figure 6, the extended tip of the picking member 144 moves substantially in a straight line and substantially vertically.

While the link 148 is moving in a circular path, the fulcrum link 162 moves in an arcuate path substantially from the position shown in Figure 4 to the position shown in Figure 6 and back again. Since the length of member 146 from the center of bearing 156 to the center of bearing 166, is very much greater as compared to the lengths of the links 148 and 162, the slope of a line drawn from the center of stub shaft 154 through the center of stub shaft 164 does not vary much as the links 148 and 162 swing from the position shown in Figure 4 to the position shown in Figure 6. However, as the link passes from the position shown in Figure 6, through the position shown in Figure 7, and to the position shown in Figure 4, then there is considerable variation in the slope of the line drawn through the centers of the stub shafts 154 and 164, and, in fact, the value of slope changes sign. It is by reason of this feature that the novel path of movement shown in Figure 8 is obtained.

As clearly shown in Figures 4 to 7, the extended tips of the picking members 144 are adapted to overlap the center line of the conveyor from which the fowl are suspended. This means that the opposed picking members 144 engage each other as they pass vertically along the straight portion of the path of the fingers. This is very desirable in picking the legs of fowl in that the legs are then completely surrounded by moving picking elements which act to completely strip the garter feathers from the fowl. It can be seen that the fingers come together against the leg of the fowl in the positions shown in Figure 4 and move downwardly vertically through the position shown in Figure 5, to the position shown in Figure 6, which is just short of the upper fleshy portion of the leg of the fowl. The fingers are then withdrawn and move upwardly, through the position of Figure 7, to return to their initial position shown in Figure 4, whereupon the cycle is repeated.

The shackles with the fowl suspended therefrom are usually positioned in a plane transverse to the direction of movement of the conveyor. In the use of this machine, it is desirable that the shackles be turned approximately 90° so that they will lie in a plane substantially parallel to the direction of movement of the conveyor, as shown in Figures 1 and 2. Therefore, means are also provided for automatically turning the poultry shackle 47, from the position that it generally occupies to the position shown in Figure 1, prior to the legs of the fowl entering between the opposed picking members 144.

The means for turning the shackle 47 includes a pair of members, each generally indicated at 168, which extend forwardly of the ends of the picking members 144. The forward or leading edges 170 of members 168 taper inwardly toward each other and funnel the legs into the passageway between the picking members 144.

The members 168 are positioned so that they extend across the usual path of travel of the legs of the fowl, which path is followed when the fowl is suspended from a shackle which is normally positioned transverse to the direction of movement of the conveyor. As the legs engage the leading edges 170 and move therealong, the legs are forced toward each other. Since there is great resistance to having both legs forced between the picking members 144 at the same time, the legs seek to get one behind the other and this tends to rotate the shackle so that the legs are positioned to move in single file between the picking members 44. The members 168 also serve to prevent the legs of a fowl from getting behind the picking members 144.

The novel construction of the picking members 144 themselves also contributes to the successful operation of this picking machine. The details of construction of the picking members are shown in Figures 9 to 11.

The picking members 144 include an elongated mounting member generally indicated at 172 and a plurality of picking fingers 174. The elongated mounting member 172 includes a pair of tubular spacers 176 which are adapted to be secured by some appropriate means, such as by welding, to the ends of members 146. The elongated mounting member 172 also includes a pair of elongated angles 178 and 179, and a pair of plates 180 and 181 to the respective ends of which are secured elongated tubular members 182 and 183.

The upstanding legs of angles 178 and 179 are spaced, respectively, from the tubular members 182 and 183 thereby bounding a pair of oppositely opening elongated mounting channels into which portions of the picking fingers are adapted to be inserted. The plates 180 and 181, and the legs of angles 178 and 179 adjacent thereto, are bored to permit the extension therethrough of clamping bolts 184 which also extend through the tubular spacer 176.

The picking fingers 174 include a mounting, a flange, portion 186 and a picking portion 188. The picking portions of the fingers are of rectangular cross-section and the top and bottom sides 190 and 192 taper toward each other from adjacent mounting flange 186 to the extended tip of the finger. The fingers have substantially parallel lateral sides.

A shoulder 194, best seen in Figure 9, is provided on the mounting flange 186. This shoulder 194 serves to space the picking portion 188 of the adjacent fingers away from each other so as to permit lateral flexing of the fingers toward each other, as would occur when a body is moved along the length of picking member 144 in engagement with the tips of the fingers 174.

The extended tips of the fingers have a plurality of lateral grooves 196 and 198 therein, thereby forming a plurality of vertically spaced ribs 200, 202 and 204 thereon. The extended reach of the ribs varies along the height of the finger as is clearly seen in Figure 10, wherein the rib 200 extends to the right further than does rib 202, which in turn extends further than rib 204.

It has also been found that better picking results are obtained if the tips of the fingers have arcuate recesses therein at 206, 208 and 210, respectively, for each of the ribs 200, 202 and 204, as shown in Figure 9.

The guide members 168 previously described are positioned at the ends of the picking members 144 and secured thereto in any well known manner such as by means of bolts or pins 212 extending through portions of the elongated mounting member 172. These guide members 168 have portions 214 thereof extending adjacent the lateral edges of the end picking fingers 174, and serve to restrain the picking fingers 174 from lateral movement out of the elongated mounting member 172. The guide members 168 are prevented from rotating about their mounting pin or bolt 212 by means of the transverse member 216 which engages the pward extending flange of the elongated angle 179, as clearly shown in Figures 9 and 10.

The picking member is assembled simply by inserting the flanges 186 of fingers 174 into an open end of the mounting channels of mounting member 172 and sliding the fingers inwardly until the picking member 144 is built up to its full length. The bolts 184 and associate nuts 185 provide means for causing the various portions of mounting member 172 to firmly grip the flanges 186. It can also be seen that this structure permits easy disassembly to permit easy replacement of damaged picking fingers.

I claim:

1. A fowl picking machine comprising a supporting structure, a movable picking member adapted to be positioned along the run of a fowl suspending conveyor, an elongated member supported by said supporting structure and having said picking member secured thereto adjacent one end thereof, a rotatable crank means connected to the other end of said elongated member having means thereon adapted to be connected to a rotating drive member, an oscillating crank means carried by said supporting structure and connected to said elongated member at a point intermediate the ends thereof, and the spacing between the connections of the oscillating crank means to the supporting structure and to said elongated member being greater than the spacing between the connection of the rotatable crank means to the elongated member and the means adapted to be connected to a rotating drive member, whereby a portion of the path of movement of the picking member is caused to be along substantially a straight line.

2. A fowl picking machine as set forth in claim 1 wherein the center of oscillation of the oscillating crank means is aligned substantially vertically with the center of rotation of the rotatable crank means, whereby the straight movement of the picking member is along a substantially vertical path.

3. A fowl picking machine comprising a supporting structure, a movable picking member adapted to be positioned along the run of a fowl suspending conveyor, an elongated member supported by said supporting structure and having secured adjacent one end thereof said picking member, a driving crank link pivotly connected to the other end of said elongated member and adapted to be connected to a rotating drive member, an oscillating fulcrum link pivotly connecting said elongated member at a point intermediate the ends thereof to said supporting structure, the effective length of said oscillating fulcrum link being greater than the effective length of said driving crank link, whereby a portion of the path of said picking member is caused to be in substantially a straight line.

4. A fowl picking machine as set forth in claim 3 wherein the center of oscillation of said fulcrum link is aligned substantially vertically with the center of rotation about which said driving crank link is adapted to be rotated, when said fulcrum link is positioned substantially horizontally, whereby the substantially straight movement of said picking member is along a substantially vertical path.

References Cited in the file of this patent

UNITED STATES PATENTS

| Number | Name | Date |
|---|---|---|
| 526,315 | Head | Sept. 18, 1894 |
| 1,980,034 | Budd et al. | Nov. 6, 1934 |
| 2,469,953 | Davis | May 10, 1949 |
| 2,479,775 | Porter | Aug. 23, 1949 |
| 2,484,235 | Mead | Oct. 11, 1949 |
| 2,539,688 | Berg | Jan. 30, 1951 |
| 2,562,681 | Pine | July 31, 1951 |
| 2,595,435 | Wolfinger | May 6, 1952 |